US012568965B2

(12) United States Patent
Sherry

(10) Patent No.: US 12,568,965 B2
(45) Date of Patent: Mar. 10, 2026

(54) ANTIMICROBIAL COMPOSITION COMPRISING AN ALKYLDIMETHYLBENZYLAMMONIUM COMPOUND

(71) Applicant: The Procter & Gamble Company, Cincinnati, OH (US)

(72) Inventor: Alan Edward Sherry, Newport, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 265 days.

(21) Appl. No.: 18/363,002

(22) Filed: Aug. 1, 2023

(65) Prior Publication Data

US 2024/0041033 A1 Feb. 8, 2024

(30) Foreign Application Priority Data

Aug. 1, 2022 (EP) .................................... 22188006

(51) Int. Cl.

*A01N 25/00* (2006.01)
*A01N 25/06* (2006.01)
*A01N 25/24* (2006.01)
*A01N 25/30* (2006.01)
*A01N 25/34* (2006.01)
*A01N 33/12* (2006.01)

(52) U.S. Cl.

CPC ............ *A01N 33/12* (2013.01); *A01N 25/06* (2013.01); *A01N 25/24* (2013.01); *A01N 25/30* (2013.01); *A01N 25/34* (2013.01)

(58) Field of Classification Search

None

See application file for complete search history.

(56) References Cited

U.S. PATENT DOCUMENTS

| | | | | |
|---|---|---|---|---|
| 10,806,144 | B2 * | 10/2020 | Modak | A61K 8/43 |
| 10,912,299 | B2 † | 2/2021 | Herdt | |
| 11,140,898 | B2 † | 10/2021 | Kloeppel | |
| 2006/0166849 | A1 | 7/2006 | Kilkenny | |
| 2010/0227930 | A1 | 9/2010 | Lusignan | |
| 2018/0084777 | A1 † | 3/2018 | Jiang | |
| 2020/0305437 | A1 † | 10/2020 | McGeechan | |
| 2024/0041034 | A1 | 2/2024 | Sherry | |

FOREIGN PATENT DOCUMENTS

| | | | |
|---|---|---|---|
| CA | 3094849 | A1 | 10/2019 |
| EP | 3263687 | A1 | 1/2018 |
| JP | 2004224703 | A | 8/2004 |
| JP | 2020200269 | A † | 12/2020 |
| WO | 2017192417 | A1 | 11/2017 |
| WO | 2018013523 | A1 | 1/2018 |
| WO | 2022106354 | A1 | 5/2022 |
| WO | 2022119991 | A1 | 6/2022 |

OTHER PUBLICATIONS

All Office Actions; U.S. Appl. No. 18/363,004, filed Aug. 1, 2023.
Extended EP Search Report and Opinion for 22188006.5 dated Jan. 5, 2023, 9 pages.

* cited by examiner
† cited by third party

*Primary Examiner* — Susan T Tran
(74) *Attorney, Agent, or Firm* — Gary J. Foose

(57) ABSTRACT

An aqueous antimicrobial composition having from about 0.08% to about 0.8% by weight of the composition of an alkyldimethylbenzylammonium compound; from about 0.01% to about 1.5% by weight of the composition of a surfactant selected from the group consisting of alkyldimethylamine oxide, alkyldi(hydroxyethyl)amine oxide, alkylpolyglucoside, alkylbetaine, and a mixture thereof wherein the average alkyl chain length of the surfactant is less than 12 carbon atoms; from 0 to about 0.5% by weight of the composition of a polymer; at least 80% by weight of the composition of water; wherein the composition is substantially free of dialkyldimethylammonium compound.

13 Claims, No Drawings

ANTIMICROBIAL COMPOSITION COMPRISING AN ALKYLDIMETHYLBENZYLAMMONIUM COMPOUND

FIELD OF THE INVENTION

The present invention is in the field of antimicrobial compositions. The composition provides residual biocidal properties.

BACKGROUND OF THE INVENTION

Compositions such as those described in WO 2016/086012 A1 provide long-lasting antimicrobial benefits but can also leave behind a sticky/tacky feel on surfaces and/or a poor shine profile feel that connotes lack of cleanliness to the user. The compositions require relatively high levels of polymer that can result in increased surface residue and decreased ability to remove existing soils, meaning poorer cleaning. Additionally, the need for relatively high quaternary ammonium active levels to accomplish long-lasting antimicrobial benefits can lead to increased composition toxicity.

Therefore, a need remains for an antimicrobial cleaning composition that provides long-lasting residual antibacterial protection, improve surface feel and shine, better cleaning all while mitigating reduced toxicity and safety concerns.

SUMMARY OF THE INVENTION

It has surprisingly been found that judicious selection of surfactant and quaternary ammonium compound type can provide these desired attributes. According to the first aspect of the present invention, there is provided an antimicrobial cleaning composition. The composition is stable on storage. The composition provides good cleaning and good shine and it does not leave the treated surface streaky or tacky. The composition provides strong biocidal properties to the treated surface and can present a good scent profile.

According to the second aspect of the invention there is provided an article treated with the composition of the invention, the article is preferably a non-woven substrate, more preferably in the form of a substrate. Preferably, the article is a wipe treated with the composition of the invention.

According to the third aspect of the invention there is provided a product comprising the composition of the invention and a spray device. The spray device can for example be an aerosol spray can or a trigger spray bottle.

According to another aspect of the invention there is provided a method of treating a surface, preferably an inanimate surface, with the composition of the invention to provide residual biocidal properties to the surface.

According to the last aspect of the invention there is provided the use of the composition of the invention to provide residual biocidal properties to a surface, in particular to a hard surface.

The elements of the composition of the invention described in relation to the first aspect of the invention apply mutatis mutandis to the other aspects of the invention.

DETAILED DESCRIPTION OF THE INVENTION

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mould and algae. Viral particles (i.e., enveloped and non-enveloped viruses) and other infectious agents are also included in the term microbe.

"Antimicrobial" further should be understood to encompass both microbicidal and microbiostatic properties. That is, the term encompasses microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad-spectrum activity (e.g., against bacteria, viruses and fungi). When speaking of efficacy against a particular microorganism or taxonomic rank, the more focused term will be used (e.g., antifungal to denote efficacy against fungal growth in particular). Using the above example, it should be understood that efficacy against fungi does not in any way preclude the possibility that the same antimicrobial composition may demonstrate efficacy against another class of microbes.

Residual biocidal properties refer to achieving at least 99.9% microbial reduction in the Environmental Protection Agency (EPA)-approved 24 hour Residual Self Sanitizing (RSS) test methodology for dried product residues on hard, non-porous surfaces (EPA Protocol #01-1A). That is, the compositions of the invention displaying residual biocidal properties are able to deliver at least 99.9% microbial reduction after a 12-abrasion and 5-reinoculation 24 hour testing regime.

Antimicrobial Composition

The present invention is directed to an antimicrobial composition. The composition comprises:

i) from about 0.08% to about 0.8%, preferably from about 0.1% to about 0.6% by weight of the composition of an alkyldimethylbenzylammonium compound;

ii) from about 0.01% to about 1.5%, preferably from about 0.1% to about 0.6% by weight of the composition of a surfactant selected from the group consisting of alkyldimethylamine oxide, alkyldi(hydroxyethyl) amine oxide, alkylpolyglucoside, alkylbetaine, and a mixture thereof; preferably the average alkyl chain length of the surfactant is less than 12 carbon atoms;

iii) from 0 to about 0.5%, preferably from 0 to about 0.3% by weight of the composition of a polymer;

iv) at least 80% by weight of the composition of water;

wherein the composition is substantially free of dialkyldimethylammonium compound.

The composition can further comprise a pH adjusting agent, dye, hydrotrope, fragrance, and the like, among other components. The composition is an aqueous solution, preferably the composition comprises more than 80%, more preferably more than 85% and especially from 90 to 99.5% by weight of the composition of water.

The composition is formulated to provide antimicrobial and residual biocidal properties for at least 24 hours by delivering at least 99.9% microbial reduction in the EPA-approved 24-hour Residual Self Sanitizer (RSS) test method (EPA #01-1A). Alternatively, the composition is formulated to provide antimicrobial and residual biocidal properties for at least 24 hours by delivering at least 99.9% microbial reduction in the EPA-approved 24-hour Residual Self Disinfectant (RSD) test method (EPA #01-1A). The composition can be applied to a surface by spraying, rolling, fogging, wiping or other means. Preferably, the composition is applied to the surface and left to dry. The composition acts as a surface sanitizer or disinfectant, killing or inactivating infectious microbes present on the surface for at least 24 hours. In one embodiment, the composition is also effective at inactivating enveloped viruses present on the surface for at least 24 hours.

Upon drying, the composition of the invention leaves behind a residual protective film or coating on the surface. The coating will remain on the surface and is water- and wear-resistant; it is durable to multiple touches and wearing of the surface. The treated surface shows good shine appearance as the coating or film is engineered to be nearly invisible. At the same time, the residual film or coating possesses a biocidal property, enabling it to maintain protection of the surface against microbial contamination, including bacteria, viruses and fungi, for an extended time period (e.g., at least 24 hours, more preferably at least 48 hours or 72 hours) following application. The composition of the invention surprisingly provides residual biocidal properties even when the composition comprises a very low level of film-forming polymer or when the composition is completely free of polymer.

Alkyldimethylbenzylammonium (ADMBA) Compound

Suitable ADMBA compounds for use herein include a blend of C12-C16 alkyldimethylbenzylammonium compound, a blend of C12-16 alkyldimethyl(ethylbenzyl)ammonium compound and a mixture thereof, also referenced herein as 'benzalkonium compound' or 'benzalkonium quaternary ammonium compound'. The ADMBA compound can have a counterion selected from the group consisting of a halogen, sulfonate, sulfate, phosphonate, phosphate, saccharinate, carbonate/bicarbonate, hydroxy, or carboxylate. Preferably the ADMBA is selected from the group consisting of C12-C16 alkyldimethylbenzylammonium chloride (ADMBAC), C12-C16 alkyldimethylbenzylammonium saccharinate (ADMBAS), C12-C16 alkyldimethyl(ethylbenzyl)ammonium chloride (ADMEBAC), and a mixture thereof. More preferably, the ADMBA compound is selected from the group consisting of C12-C16 alkyldimethylbenzylammonium chloride (ADMBAC), C12-C16 n-alkyldimethyl (ethylbenzyl)ammonium chloride (ADMEBAC), and a mixture thereof. Chemical structures of preferred ADMBA compounds of the invention are as follows:

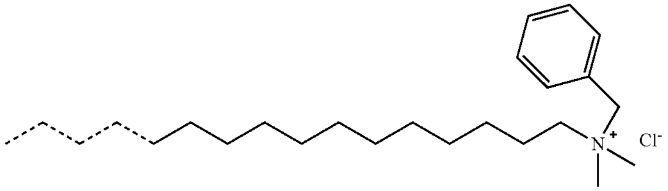

C12-C16 ADMBAC

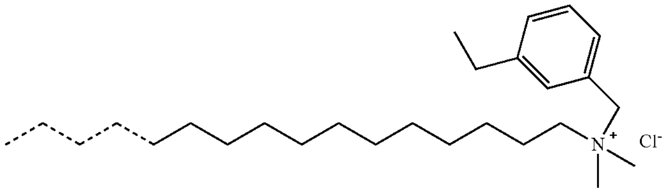

C12-C16 ADMEBAC

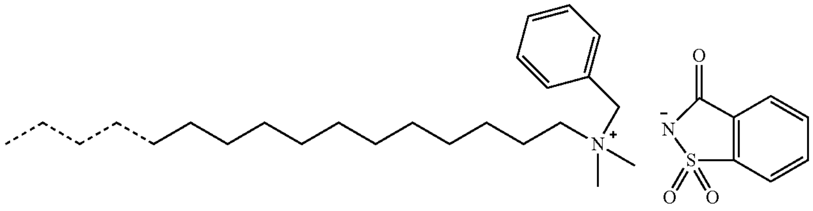

C12-C16 ADMBAS

Examples of suitable commercially available ADMBA compounds include, but are not limited to, Barquat® MB-50, supplied by the Arxada Company as a 50% active ADMBAC solution in water (~40%) and ethanol (~10%), BTC 8358, supplied by Stepan as an 80% active ADMBAC solution in water (~10%) and ethanol (~10%), Onyxcide 3300, supplied by Stepan as 95+% ADMBAS solid/powder, and Barquat 4280-Z or Maquat MC 1412-50, supplied by Arxada and Pilot Chemical respectively as 50% active solutions of a blend of ADMEBAC and ADMBAC in water (40%) and ethanol (10%). The composition comprises from about 0.08% to about 1.0%, preferably from about 0.10% to about 0.8%, more preferably from about 0.12% to about 0.6%, especially from about 0.15% to about 0.45% ADMBA compound by weight of the composition. Preferably, the composition comprises from about 0.1% to about 0.5% by weight of the composition of an ADMBA compound selected from the group consisting of C12-16 alkyldimethylbenzylammonium chloride, C12-C16 alkyldimethyl(ethylbenzyl)ammonium chloride, and mixtures thereof.

Preferably, the composition comprises from about 0.1% to about 0.7% by weight of the composition of C12-C16 alkyldimethylbenzylammonium saccharinate.

Actual ADMBA compound weight content will depend on a number of factors including compound molecular weight; for example, the Onyxcide 3300 active (ADMBAS) has an average molecular weight of 527 g/mol, 50% higher than the average molecular weight of the Barquat MB-50 active (ADMBAC, 357 g/mol). This means that on a weight basis, ADMBAS active comprises about a third less C12-C16 alkyldimethylbenzylammonium cationic group than the corresponding ADMBAC active. However, lower weight efficiency for ADMBAS relative to either ADMBAC or ADMEBAC does not necessarily imply inferior preference. ADMBAS is substantially insoluble in water and is only slowly solubilized in some surfactant-containing water solutions, and this can be beneficial. First, reduced solubility or dissolution speed in water-based media will mitigate the tendency for the material to be washed away via water-based abrasion, which helps residual biocidal activity. Second, reduced solubility or dissolution speed in water-based media can also mitigate the composition's toxicity by slowing down or limiting compound permeation into skin or into eyes or into other bodily sensitive areas. Consequently, use applications exist for which the ADMBAS compound can be preferred to ADMBAC or ADMEBAC compounds despite the lower weight efficiency.

The overall level of ADMBA compound content also depends upon the benefits sought. In one embodiment, a higher ADMBA compound content (e.g., 0.4% to 1% or 0.5% to 0.8%) is preferred for use applications aimed at delivering faster biocidal contact times and increased broad spectrum microbiocidal activity. In another embodiment, the ADMBA content is preferably on the lower end of the range (e.g., 0.08% to 0.5% or 0.1% to 0.4%) so as to maximize surface end result shine appearance resulting from product treatment; it is observed that the surface appearance properties resulting from application of the composition of the invention tends to improve as the level of ADMBA compound (e.g., either ADMBAC, ADMEBAC or ADMBAS, or mixtures thereof) is reduced, ceteris paribus.

Dialkyldimethylammonium Compound

The composition of the invention is substantially free of dialkyldimethylammonium compound. By "substantially free", it is herein meant that the composition does not have dialkyldimethylammonium compound added purposively, or that the composition has less than 30% intentionally added dialkyldimethylammonium compound, more preferably less than 20% added dialkyldimethylammonium compound, and most preferably less than 10% added dialkyldimethylammonium compound by weight of the total antimicrobial (benzalkonium+dialkyl) quaternary ammonium compounds in the composition. In a preferred embodiment, the composition is completely free of dialkyldimethylammonium compound. It is found that incorporation of dialkyldimethylammonium compound into the composition of the invention leads to undesirable filming and streaking issues on hard surfaces. In general terms, the higher the dialkyldimethylammonium compound content, the worse the overall shine profile on surface provided by that composition.

By "substantially free", it is herein meant that the composition comprises less than 0.05%, preferably less than 0.01% by weight of the composition of a dialkyldimethylammonium compound.

Polymer

The composition comprises from 0 to about 0.5%, preferably from 0 to about 0.3%, more preferably from 0 to about 0.1% by weight of the composition of a polymer. More preferably, the composition is completely free of polymer. It has surprisingly been found that the composition can successfully deliver residual biocidal activity even in complete absence of polymer. The polymer can alternatively be incorporated with the goal of enhancing visual shine appearance of the treated surface. Polymers can enhance the wetting properties of the composition, resulting in visually reduced streaking and spotting on a surface. Yet another advantage of the polymer can be for cleaning, especially for removal of particulate and greasy particulate soils or for delivering a (preferably non-visible) film on a surface that promotes easier 'next time' use soil removal. Polymers for use herein are non-ionic, cationic or zwitterionic polymers. Preferably, the compositions of the invention are free of anionic polymers. Preferably, the polymer is a vinylpyrrolidone polymer. Preferably, the vinylpyrrolidone polymer is selected from the group consisting of a partially butylated polyvinylpyrrolidone polymer, a copolymer of vinylpyrrolidone and dimethylaminopropyl methacrylamide, a copolymer of vinylpyrrolidone and dimethylaminoethylmethacrylate quaternized with diethyl sulfate, and a mixture thereof.

In one embodiment, the polymer comprises one or more a vinylpyrrolidone monomers of generalized chemical structure:

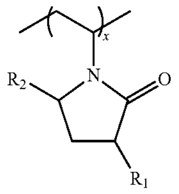

wherein R1 and R2 are independently H, or a C1-C6 hydrocarbon chain, and where x is from about 50 to about 100,000. The polymer preferably has a molecular weight of from about 5,000 to about 40,000 g/mol, more preferably from about 10,000 to about 100,000 g/mol, even more preferably from about 12,000 to about 60,000 g/mol. An even more preferred polymer is partially butylated polyvinylpyrrolidone. Non-limiting examples of commercially available polyvinylpyrrolidone and substituted polyvinylpyrrolidone polymers for use in the invention include Luvitec K-17, a homopolymer of PVP sold by BASF (Mw~9,000), PVP-K60, a homopolymer of PVP sold by Ashland (Mw~60,000), and Ganex P-904 LC, a copolymer of vinyl pyrrolidone and butylated vinyl pyrrolidone sold by Ashland (Mw~16,000).

In another embodiment, the polymer is cationic and preferably hydrophilic. The polymer can comprise one or more a vinylpyrrolidone derivative monomer, and in some cases a second monomer class comprising a pendant amino group or quaternary ammonium group as described below. Ternary polymers comprising vinyl pyrrolidone or substituted vinyl pyrrolidone monomer, a second monomer with pendant amino or quaternary groups and a third non-ionic or cationic monomer can also be used. Amino groups that can be protonated and quaternary ammonium groups within the polymer enable the polymer to bond to negatively charged hard surfaces such as glass and porcelain and deliver surface protection. It is believed that polymer anchoring (via pendant cationic groups) to a hard surface can help reduce or prevent soil anchoring/adhesion on said hard surface, which can result in easier next time cleaning benefits. Moreover, the selection of a hydrophilic polymer is advantageous in that oily and greasy soils do not interact with the deposited polymer film and are therefore easier to remove. Hydrophilic polymers promote better product surface wetting and are also water strippable (e.g., with the next product application), thereby eliminating build-up problems that can lead to a dull and dirty vs. shiny and clean hard surface appearance. Vinyl pyrrolidone-based polymers, especially those further comprising pseudo cationic (amino) groups or quaternary ammonium groups can also improve the shine end result of treated surfaces.

Many of the desirable vinylpyrrolidone-based polymers described above also include acrylate and methacrylate esters, or acrylamide and methacrylamide amide-based monomers of chemical structure:

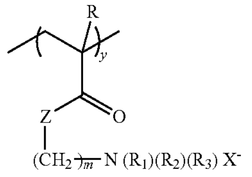

wherein R=H or $CH_3$, Z=O, NH, N—$CH_3$, m=1-4, $R_1$, $R_2$, $R_3$ are independently H, $CH_3$ or a C2-C6 hydrocarbyl group, y is from about 10 to about 10,000, and X is a counter-ion. The counter-ion can be chloride, hydrogen sulfate, methyl sulfate, sulfate, or any counter-ion present in the formulation, such as sodium, potassium, ammonium, bicarbonate, acetate, bromide, and the like. Those skilled in the art will note that the above chemical structure shows a rendering of a pendant quaternary ammonium group or a non-ionic amino group that is rendered cationic by protonation.

Non-limiting examples of suitable commercially available cationic copolymers include Sorez HS-205 a copolymer of vinylpyrrolidone and dimetylaminoethylmethacrylate sold by Ashland (Mw~1,000,000), Luvitec VA 64W a copolymer of vinylpyrrolidone and vinyl acetate sold by BASF (Mw~65,000), Styleze CC-10, a copolymer of vinylpyrrolidone and dimethylaminopropyl methacrylamide sold by Ashland (with chloride counter-ion, Mw~1,300,000), Setleze 3000, another copolymer of vinylpyrrolidone and dimethylaminopropyl methacrylamide sold by Ashland (with sulfate counter-ion, Mw~1,700,000), Gafquat HS-100 a copolymer of vinyl pyrrolidone and trimethylammonium chloride propylmethacrylamide sold by Ashland (Mw~1,000,000), Gafquat 440 (or 755, 755N or 734) a copolymer of vinylpyrrolidone and dimethylaminoethylmethacrylate quaternized with diethyl sulfate (Mw~1,000,000) sold by Ashland, and Luvitec VPC 55K65W a copolymer of vinylpyrrolidone and vinylcaprolactam sold by BASF (Mw~750,000). Styleze CC-10, Setleze 300 and Gafquat 440 from Ashland are particularly preferred 'shine' polymers for enhancing the visual appearance of surfaces and may additionally improve ease of 'next time' cleaning. Non-limiting examples of suitable commercially available cationic terpolymers for the invention include Styleze W-10, a terpolymer of vinylpyrrolidone, dimethylaminopropylmethacrylamide and dimethylaminopropylmethacrylamide quaternized with N-dodecyl chloride sold by Ashland (Mw~2,700,000), Gaffix VC-713 a terpolymer of vinylpyrrolidone, vinyl caprolactam and diethylaminoethylmethacrylate sold by Ashland (Mw~80,000) and Luviset Clear AT3 a terpolymer of vinylpyrrolidone, vinylimidazole and methacrylamide sold by BASF. Those skilled in the art will appreciate that manipulation of polymer molecular weight and hydrophilicity-hydrophobicity, and degree of cationic character can fine tune polymer physical property characteristics as needed.

The composition can also comprise a soil entrainment polymer to aid in removal of particulate soils from hard surfaces. As such, the soil entrainment polymer provides a complementary benefit to the remainder of the composition. The entrainment polymer has a molecular weight from about 50,000 to about 10,000,000, more preferably from about 100,000 to about 8,000,000. Examples of such polymers for use in hard surface cleaning applications are disclosed in U.S. Pat. Nos. 6,653,274 and 8,568,702 (herein incorporated by reference). The entrainment polymer is a flocculating or coagulating polymer and has high affinity for cellulosic fibres typically used in cleaning implements (e.g., paper towels, newspapers, pre-moistened wipes). Such properties drive the soil removal process and limit re-deposition. Preferred polymers are either highly ethoxylated materials or highly charged materials. Non-limiting examples of suitable soil entrainment polymers include Hyperfloc NE823F, Hyperfloc ND823 A from Hychem, Mirapol Surf S-100 and Mirapol HSC 300 from Solvay, and Lupasol SK from BASF. Mirapol HSC 300 is a particularly preferred entrainment polymer that combines high molecular weight (Mw>500,000) together with both positively charged and negatively charged monomers and has the chemical structure:

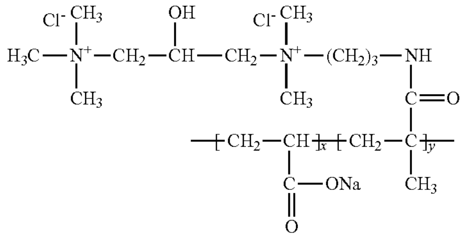

wherein the weight ratio y/z is from about 1:5 to about 5:1, more preferably y/z~2:1. This polymer displays a high affinity for particulate soils and hydrophilic fibres, and additionally can enhance the wetting properties of the overall composition. If present, the soil entrainment polymer comprises less than 0.2% by weight of the overall composition. More preferably the soil entrainment polymer or mixture of polymers) comprises from about 0.002% to about 0.15% and most preferably from about 0.005% to about 0.10% or from about 0.01% to about 0.05% by weight of the overall composition.

Surfactant

The composition of the invention comprises from about 0.01% to about 1.5% by weight of the composition of a surfactant, the surfactant is selected from the group consisting of alkyldimethylamine oxide, alkyl di(hydroxyethyl)

amine oxide, alkylpolyglucoside, alkylbetaine, and a mixture thereof. Preferably, the average alkyl chain length of the surfactant is less than 12 carbon atoms, preferably 6 or more carbon atoms. Preferably, the surfactant is selected from the group consisting of alkyldimethylamine oxide, alkylpolyglucoside, and a mixture thereof. Preferably, the composition of the invention comprises from about 0.01% to about 1%, more preferably from about 0.05% to about 0.5% by weight of the composition of a surfactant selected from the group consisting of alkyldimethylamine oxide, alkylpolyglucoside, alkylbetaine, and a mixture thereof.

The composition can comprise other non-ionic, cationic or zwitterionic surfactant and mixtures thereof. The composition is preferably free of anionic surfactant.

A preferred composition comprises from about 0.03 to about 0.6%, more preferably from about 0.05 to about 0.5% by weight of the composition of a surfactant selected from the group consisting of 2-ethylhexyl alkylpolyglucoside, C8-C10 alkylpolyglucoside, C8-C12 alkyldimethylamine oxide, especially C10 alkyldimethylamine oxide, C8-C12 alkylbetaine, especially C10 alkyldimethylbetaine, and a mixture thereof. Average chain length of a surfactant is computed by taking the weight average of the longest carbon chain originating from the head group for each surfactant raw material or blend of raw materials. For example, if a composition comprises 0.6% C10 dimethylamine oxide and 0.4% C12 dimethylamine oxide, then the average amine oxide chain length is 60% C10+40% C12 or 10.8 carbons atoms.

Alkylpolyglucoside Surfactant

Alkylpolyglycosides are biodegradable non-ionic surfactants. Polyglycosides include polypentosides and polyglucosides and other sugar-based non-ionic surfactants. Alkylpolyglycosides include those represented by the formula $R_1O(Z)_a$ wherein R is a monovalent organic radical having from about 6 to about 12 carbon atoms, Z is a saccharide residue having 5 or 6 carbon atoms, preferably 6 carbon atoms and a is a number from 1 to 3 (i.e., alkylpolyglucoside). Examples of suitable alkylpolyglucoside (APG) surfactants are the TRITON™ alkylpolyglucosides from Dow; Agnique PG, Disponil APG and Glucopon alkylpolyglucosides from BASF. Preferred alkylpolyglucoside surfactants are those where n is 8 to 12, more preferably 8 to 10. Non-limiting examples of preferred commercially available polyglucosides include AG 6202, a 2-ethylhexyl APG raw material from Nouryon, Triton CG-50 and Triton CG-110, both of which are C8-10 APG raw materials from Dow Chemical, and Glucopon 225 a C8-C10 APG from BASF. Other examples include Glucopon 325 and Glucopon 425 sold by BASF.

In a preferred embodiment, the level of higher chain length APG is kept low, such that the average APG chain length is kept below C12, more preferably below C11, and most preferably below C10.

Short chain alkylpolyglucosides, in combination with the ADMBA compounds of the invention, are found to provide much improved shine end result on surfaces, even in the presence of soils such as oil and grease, relative to most other suitable surfactants. Short chain polyglucosides, in combination with the ADMBA compounds of the invention are also found to provide fast bactericidal, fungicidal and virucidal properties, and deliver 24-hour RSS benefits.

Amine Oxide Surfactant

Amine oxide surfactants are suitable for use in the compositions of the invention. Amine oxides suitable for use herein can be represented by the formula R1R2R3NO wherein R1 is a is a hydrocarbon comprising between 8 and 12 carbon atoms, R2 and R3 are independently C1-C4 alkyl or hydroxyalkyl groups (e.g., hydroxyethyl), more preferably methyl groups.

The composition of the invention preferably comprises from about 0.03 to about 1.0%, more preferably from about 0.05 to about 0.6% and more preferably from about 0.1 to about 0.5% by weight of the composition of C8-C12 dimethylamine oxide surfactant.

C8 alkyldimethylamine oxide is commercially available under the trade name Genaminox® OC from Clariant and Macat AO-8 from Pilot; C10 alkyldimethylamine oxide, a highly preferred amine oxide, is commercially available under the trade name Genaminox® K-10 from Clariant and Macat AO-10 from Pilot Chemical; C12 alkyldimethylamine oxide is available under the tradename Macat AO-12 from PilotChemical. Short chain amine oxides, especially C10 alkyldimethylamine oxide, in combination with the ADMBA compounds of the invention, are found to provide much improved shine end result on surfaces, even in the presence of soils such as oil and grease, relative to most other suitable surfactants. Short chain amine oxides, in combination with the ADMBA compounds of the invention are also found to provide fast bactericidal, fungicidal and virucidal properties, and deliver 24-hour RSS benefits. In a preferred embodiment, the level of higher chain length amine oxide is kept low, such that the average amine oxide chain length is below 12 carbon atoms.

Zwitterionic and Amphoteric Surfactant

The composition of the invention may comprise an amphoteric surfactant, a zwitterionic surfactant, and mixtures thereof. Suitable zwitterionic surfactants typically contain both cationic and anionic groups in substantially equivalent proportions so as to be electrically neutral at the pH of use, and are well known in the art. Some common examples of zwitterionic surfactants are described in U.S. Pat. Nos. 2,082,275, 2,702,279 and 2,255,082.

Suitable zwitteronic surfactants include alkylbetaines and sulfobetaines according to the chemical structures (A) and (B) below:

Suitable betaines are the alkylbetaines of the formula (Ia), the alkylamidobetaine of the formula (Ib), the sulfo betaines of the formula (Ic) and the amido sulfobetaine of the formula (Id);

R1-N+(CH3)2-CH2COO— (A)

R1-N+(CH3)2-CH2CH(OH)CH2SO3- (B)

in which R1 is a saturated or unsaturated C8-C12 alkyl residue. Particularly preferred are betaines of the formula Ia, especially C8-C12 alkylbetaines or C10 alkylbetaine.

Weight Ratio of Surfactant to Quaternary Ammonium Compound

Optimizing the surfactant to quaternary ammonium compound weight ratio involves resolving a trade-off between achieving residual biocidal benefits and promoting surface shine end result appearance. It is found that a lower surfactant to quaternary ammonium compound weight ratio (i.e., about 1.5:1 and lower) promotes residual biocidal RSS (or RSD) activity (ceteris paribus) but is non-ideal to drive good surface shine and cleaning. A high surfactant to quaternary ammonium compound weight ratio (i.e., about 1:1 and preferably higher) is beneficial for surface shine and cleaning properties (ceteris paribus) but is non-ideal to achieving strong RSS (or RSD) activity. As such, the surfactant to quaternary ammonium compound ratio can vary significantly depending on specific formulation objectives and cost targets. In one embodiment, the weight ratio of surfactant to quaternary ammonium compound is from about 0.2:1 to about 1:1 or from about 0.5:1 to 1:1. In another embodiment, the weight ratio of surfactant to quaternary ammonium compound is from about 1:1 to about 4:1, or from about 1:1 to about 3:1. Preferred weight ratios to simultaneously deliver residual biocidal and shine/cleaning requirements range from about 1.2:1 to about 2:1 or from about 1.2:1 to about 1.8:1.

Anionic Surfactant

Anionic surfactant is not preferred. If anionic surfactant is present, it is preferably present at low levels. The anionic surfactant can be selected from the group consisting of: an alkyl sulphate, an alkyl alkoxylate sulphate, a sulphonic acid or sulphonate surfactant, polycarboxylated anionic surfactants and mixtures thereof. The antimicrobial cleaning composition can comprise up to 0.2 wt %, preferably up to 0.1 wt % of anionic surfactant. Preferably, the composition is free of anionic surfactant.

pH Adjusting Agents

Depending on the targeted uses, a composition of the present invention for home, institutional or industrial use may benefit from use of one or more pH buffers. For example, if the composition is used in the kitchen area, an alkaline pH product may be desired in order to effectively remove grease soils commonly found in the area. If the composition is used in a bathroom area, soap scum and hard water deposits may be the primary concern. In such cases, an acidic pH product may be more appropriate. Final pH of the composition is from about 3 to about 12, or from about 4 to about 11; in one embodiment the pH is from about 3 to about 7; in another embodiment the pH is from about 5 to about 11. There is no limitation on the types of pH adjusting agents that can be added into the liquid composition of the present invention. Example of pH adjusting agents that can be used include, but are not limited to, triethanolamine, diethanolamine, monoethanolamine, sodium hydroxide, sodium carbonate, ammonium hydroxide, potassium hydroxide, potassium carbonate, sodium bicarbonate, potassium bicarbonate, citric acid, acetic acid, lactic acid, succinic acid, and the like. Preferably, alkaline compositions comprise from about 0.01 to about 0.5% of an alkanol amine. In a preferred embodiment, monoethanolamine, monoisopropanolamine and/or triethanolamine are used as pH adjusting agents. Acidic compositions can comprise from 0.01 to 0.5% of an organic acid, preferably citric acid or lactic acid.

Di-Valent Ion Salt

Di-valent ion salts are optional ingredients that can be beneficial depending on the specific formulation. The primary purpose of di-valent ions is to aid the achievement of residual self sanitizer benefits on hard surfaces. Di-valent ions are provided by salts, especially magnesium and calcium salts; examples include magnesium chloride, magnesium acetate, magnesium sulfate, calcium chloride, calcium bromide, and the like. While not wishing to be limited by theory, it is believed that di-valent ions help reduce surface and interfacial tension of the compositions of the invention. This in turn can lead to improved film formation, especially in the presence of soil. Di-valent ions can be introduced in the form of tap water upon dilution of a concentrate or can be intentionally added as discrete components into the composition of the invention. When added as discrete species, the level of di-valent ion is from about 0.01% to about 2.0%, more preferably from about 0.02% to about 1.0%, or from about 0.02% to about 0.50% by weight of the overall composition.

Fragrance and Solvent

The composition may comprise a fragrance. The fragrance is a mixture of odorant raw materials, such as aromatic natural oils and aromatic chemicals, which taken together form a complex scent that delivers a number of benefits. These benefits may include the coverage of product base odour, scenting the product itself, and lingering scent radiating from the surface into the air after cleaning. When the composition is sprayed, the benefit may also include the delivery of scent to the air when spraying the composition on a surface, and the delivery of scent to the air while wiping the composition on the surface. The fragrance may comprise at least 3, at least 5, at least 7, at least 11, or at least 15 fragrance raw materials. The composition may comprise from to 1%, or from 0.02% to 0.5%, or even from 0.03% to 0.2% of fragrance by weight of the composition.

Preferably, the composition is free of glycol ether thus providing additional degrees of freedom for fragrance selection and level and promoting freshness. Glycol ether solvents have characteristic odours that can interfere or alter the character of a desired fragrance or blends of fragrances. More significantly, it is found that glycol ethers can weaken the cidal strength of deposited ADMBA compound, leading to reduced RSS efficacy. This can happen by de-wetting the surface or by assisting re-dissolution of the dried-down quaternary ammonium compound so that it can be more easily abraded away, or by any other mechanism. Moderately strong-performing RSS compositions can be rendered ineffective by the presence of glycol ether, though the effect may be level-dependent. As such, it is preferred that the low vapor pressure solvent (e.g., <1 mm Hg at 20° C.) content be kept below 2%, more preferably below 1.5% or 1.0%. Low levels, up to about 0.5% can be used for specific benefits, such as cleaning, without significantly impacting RSS performance. Still, it is found that best RSS performance is often achieved in the complete absence of glycol ether compound. As such, 0-0.5% glycol ether solvent content represents a preferred embodiment, with 0% low vapor pressure solvent being most preferred, as it simultaneously maximizes fragrance freshness dissemination and promotes enhanced residual self-sanitizer activity. When present, the glycol ether solvent is preferably ethylene glycol n-hexyl ether (e.g., tradename Hexyl Cellosolve® available from Dow Chemical), from about 0.1% to about 2%, more preferably from 0.2% to about 1.2%, or from about 0.2% to about 0.75% by weight of the composition. Ethylene glycol n-hexyl ether can be particularly useful in wet wipe disinfectant composition to mitigate de-wetting on surfaces during the dry-down process.

While glycol ether solvent is generally discouraged for use herein, high vapor solvents such as ethanol, isopropanol, ethanolamine, and the like, can advantageously be utilized to enhance composition aesthetics and cleaning properties without impacting residual biocidal benefits.

For use applications requiring strong cleaning properties, the composition of the invention can include an alkanolamine in place of, or in addition to, low levels of glycol ether. Alkanolamine compounds can simultaneously act as solvents and alkalinity/high pH buffering agents and can therefore be more efficient alternatives to glycol ethers. As such, the level of alkanolamine in the composition can be from 0 to about 1%, more preferably from 0 to about 0.5% by weight of the composition. Selection of low levels (e.g., 0-0.5% or 0-0.25%) of volatile (e.g., 1 mm Hg at alkanolamine solvent simultaneously provides cleaning power and reduces left-behind surface residue. Examples of alkanolamine compounds for use herein include triethanolamine and di-isopropanolamine, and the like. Preferred alkanolamine solvent, especially for cleaning, includes ethanolamine, isopropanolamine and 2-methyl-2-amino-1-propanol, and mixtures thereof.

Other Optional Components

The composition may include other adjuncts such as colorants, dyes, opacifiers, suds suppressors, hydrotropes, corrosion inhibitors, and the like. These materials can improve the composition aesthetics without impacting the primary benefits provided by the invention.

Water

The compositions disclosed herein comprise at least 60% water, more preferably at least 85% water. The water may be of any hardness. The water may be de-ionized water, reverse-osmosis-treated water, distilled water, tap water, or soft water (typically, soft water does not exceed ppm hardness (as $CaCO_3$)). The amount of water in a given composition depends on the degree to which the composition is concentrated. Ready-to-use compositions generally comprise greater water content than concentrated compositions, which are intended to be diluted at the point of use. A ready-to-use composition may comprise from about 80% to about 99.9%, or from about 90% to about 99.5% water, or from about 91% to about 99% water by weight of the composition.

Concentrate Composition

The composition may be in concentrated form wherein the concentrate is diluted to create a ready-to-use (RTU) composition of the invention. Dilution can be accomplished using any type of water as described above, though in many embodiments, dilution will be achieved using conventional tap water. For purposes of improved sustainability and better economics, dilute-able concentrates represent an important embodiment of the present invention. Dilution from about 1:3 (1 part concentrate plus 2 parts water) to about 1:30 (one part concentrate to 29 parts water), more preferably from about 1:4 to about 1:15 is recommended. In most embodiments, the dilution will be from about 1:5 to about 1:10 though actual dilution level will depend upon several factors including dilution means and equipment, desired concentrate price point, product safety considerations and marketing objectives. Concentrates of the invention comprise from about 0.8% to about 5% ADMBA compound, more preferably from about 1% to about 3% ADMBA compound. The concentrates also comprise from about 1% to about 15% surfactant, preferably from about 1.5% to about 10% 2-ethylhexyl APG, C8-10 APG, C8-12 alkyldimethylamine oxide, C8-12 alkyldimethylbetaine, and mixtures thereof. The concentrate can also comprises from 0 to about 6% polymer, preferably about 0.2% to about 3% of a polymer by weight of the overall composition. In cases for which the toxicological profile of the concentrate can be rendered acceptable to users, the concentrates afford the opportunity to be employed directly without dilution. This can be very advantageous to enable very short bactericidal, fungicidal, virucidal contact times (e.g., 10 seconds-1 minute) or for offering enhanced broad spectrum cidal activity vs. extremely tough to inactivate or kill microorganisms such as *Poliovirus, Tuberculosis bovis* and *Clostridium difficile* (e.g., at 1-minute to 10-minute contact times).

Wipe Article

The present invention also relates to an article treated with the composition of the invention. The article is preferably a wipe. Suitable wipes can be fibrous. Suitable fibrous wipes can comprise polymeric fibres, cellulose fibres, and combinations thereof. Suitable cellulose-based wipes include kitchen wipes, and the like. Suitable polymeric fibres include polyethylene, polyester, and the like. Polymeric fibres can be spun-bonded to form the wipe. Methods for preparing thermally bonded fibrous materials are described in U.S. application Ser. No. 08/479,096 (see especially pages 16-20) and U.S. Pat. No. 5,549,589 (see especially Columns 9 to 10). Suitable pads include foams and the like, such as HIPE-derived hydrophilic, polymeric foam. Such foams and methods for their preparation are described in U.S. Pat. No. 5,550,167; and U.S. patent application Ser. No. 08/370,695.

In a preferred embodiment, the invention relates to a wipe article whose structure and make-up is described in U.S. Pat. No. 10,874,279, incorporated herein by reference. A preferred structure of the wipe consists of multiple layers, the wipe comprising one or more scrims, which may 'sandwich' the core component of the wipe between 2 scrim components when two scrims are present. The scrim component is a fibrous component comprising a plurality of filaments and can act as a scrubbing layer and/or a metering layer. The scrim filaments preferably comprise a polymer, preferably a thermoplastic polymer. In one embodiment, the thermoplastic polymer comprises polypropylene, polyethylene, copolymer of polypropylene or copolymer of polyethylene. In a highly desired embodiment, the thermoplastic polymer is polypropylene. The scrim has a basis weight from about 3 grams per square meter to about 15 grams per square meter and is directly bonded to a core forming a coform structure. The core comprises a plurality of filaments and a plurality of solid additives. The core filaments may comprise a polymer selected from the group consisting of: polylactic acid, polycaprolactone, polyhydroxyalkanoate, polyesteramide and mixtures thereof. The core filaments may comprise a biodegradable and/or compostable polymer. The filaments may be randomly arranged within the core wipe fibrous structure as a result of the process by which they are spun and/or formed into the core fibrous structure. The solid additives, typically either wood or non-wood pulp fibers, may be randomly dispersed throughout the fibrous structure in the x-y plane. The solid additives may be randomly or non-randomly dispersed throughout the fibrous structure in the z-direction. The basis weight of the core structure is from 20 grams per square meter to about 60 grams per square meter. The weight ratio of pulp fibers to filament in the overall coform structure is preferably from about 30:70 to about 80:20, more preferably from about 40:60 to about 70:30. An equal to higher content of pulp fibers to filament can be advantageous in enabling enhanced solution volume retention by the wipe, enabling a higher solution load factor (grams of solution per gram of coform nonwoven) per wipe. A higher pulp content can also help deliver improved evenness of solution metering on a hard surface. This can result in enhanced wipe mileage for the user. The basis weight of the full coform structure comprised of at least one scrim layer and at least one core layer, more preferably one core layer conformed with 2 scrim layers, is from about 25 grams per square meter to about grams per square meter, more preferably from about 35 grams per square meter to about 60 grams per square meter. In a highly preferred embodiment, the coform wipe has a basis weight of from about 40 grams per square meter to about 55 grams per square meter.

The wipe can have any dimensions, though x-y dimension will typically range from about 15 cm to about 20 cm; in one embodiment the dimensions of the wipe are 17.5 cm×17.5 cm; in another embodiment, the dimensions are 17.5 cm×20 cm. The composition of the invention is loaded onto the dry wet wipe at a ratio of from about 3 grams of composition per gram of dry wipe to about 8 grams for composition per gram of dry wipe (3:1 to 8:1 load factor). More preferably, the composition load factor is from about 4:1 to about 7:1, and most preferably from about 4.5:1 to about 6:1.

Aerosol Composition

The composition can be made in the form of an aerosol. In addition to the composition of the invention, aerosols also comprise one or more propellants to dispense the composition from a pressurized can. The propellant can be any of those known in the art, such as n-propane, n-butane, isobutane, n-pentane, dimethyl ether, and the like, and blends thereof. Organic propellants generally constitute from about 1% to about 15%, more preferably 2% to 12% by weight of the composition. The propellant amount chosen is sufficient to fully expel the composition from the pressurized can, and this generally means an internal gas pressure of 20 to 150 pounds per square inch. In one embodiment, the propellant is a gas such as carbon dioxide, compressed air and especially, liquid nitrogen. These liquified propellants, if present, preferably constitute from about to about 3% by weight by weight of the composition. Aerosol compositions are preferably adjusted to alkaline pH, from about pH 7 to about pH 11, or from about pH 7.5 to pH 9.5. An aerosol-based composition will also typically include corrosion inhibitor agents for compositions that are directly in contact with the pressurized metal can. Non-limiting examples of corrosion inhibitors include sodium molybdate, sodium nitrite and sodium benzoate, ethanolamine, isopropanolamine, triethylamine and ammonium hydroxide. Other useful anti-corrosive compounds such as borates and silicates can also be incorporated. When present, the level of corrosion inhibitors is from about 0.02% to about 0.5%, more preferably from about 0.04% to about 0.15% by weight of the overall composition. In one embodiment, the aerosol composition is housed in a bag inside the aerosol can. In such an instance, corrosion inhibitors may not be needed.

Foam production from the actuation of aerosols onto a hard surface can deleteriously impact the residual biocidal benefits of the composition. The level of surfactant in the aerosol composition is therefore kept as low as possible. In one embodiment, the aerosol comprises from about 0.01% to about 0.50%, more preferably from 0.05% to about 0.30% of a non-ionic, cationic or zwitterionic surfactant comprising from 6 carbon atoms to 12 carbon atoms in the main chain, more preferably from 6 carbon atoms to 10 carbon atoms in the main chain. For surface shine end result appearance, the surfactant is preferably selected from the group consisting of short chain alkylpolyglucoside, short chain alkylamine oxide, short chain alkylbetaine, and a mixture thereof. In yet another embodiment, the surfactant is chosen to be an organo-silicon-based surfactant. Organo-silicon surfactants are well known in the art to provide a combination of low sudsing/foaming properties as well provide as well as 'super-wetting' properties on hard surfaces. These surfactants are very weight efficient in driving the low surface and interfacial tension properties; The level of organo-silicon based surfactant is preferably from about 0.01% to about 1.0%, more preferably from about 0.01% to about 0.50%, most preferably from 0.05% to 0.30% by weight of the composition. Examples of suitable commercially available organo-silicon surfactants for use herein include Silwet surfactants available from Momentive Performance Materials, including but not limited to such as Silwet L-77, Silwet L7600, Silwet Hydrostable 212, and the like. Other commercially suitable materials include the Xiameter OFX, Sylgard OFX and Dowsil OFX series surfactants from Dow, classified as polyalkylene oxide-modified polydimethyl siloxanes. Non limiting examples of 'OFX' surfactants include Xiameter OFX-5211 and Sylguard 0309.

Composition Tackiness, Shine End Result, Cleaning, Toxicity and Cleaning

Careful selection of the surfactant, quaternary ammonium compound and optional cleaning solvent enable the composition of the invention to provide residual self-sanitizer/self-disinfectant benefits while also simultaneously resolving the tackiness issue, the surface shine issue and the cleaning issue posed by compositions of the prior art.

Compositions of the prior art include high levels of polymer to deliver long lasting residual self-sanitizer or residual self-disinfectant benefits. The polymer is chosen to immobilize quaternary ammonium compound on treated surfaces, thereby making it less susceptible to the effects of abrasion. In effect, the polymer 'temporarily attaches' the active to the surface, ensuring that quaternary ammonium compound is available for cidal activity even after multiple touches over a 24-hour period or longer. Unfortunately, this mode of action (i.e., polymer immobilization of active on surface) may lead in some cases to noticeable tackiness surface feel. Moreover, the feel can be made worse on soiled surfaces as the polymer 'temporary attachment' mechanism is not specific to quaternary ammonium compounds; it also applies to soil. Far from providing cleaning, the compositions of the prior art in some cases can cause a deterioration in shine and cleaning that builds up and can get worse over time and with continued use. By limiting polymer content between from 0 to about 0.25%, more preferably from 0 to about 0.15%, still more preferably from 0 to about 0.10% or 0% by weight of the composition, the compositions of the present invention are noticeably less tacky or completely non-tacky after drying down on surfaces versus alternative quat-based compositions known in the art that deliver residual self-sanitizer or residual self-disinfectant benefits.

Excellent shine end result on hard surfaces is achieved by the combination of specific surfactant and ADMBA compound. While not wishing to be bound by theory, it is believed that short chain surfactant with an average chain length of less than 12 carbon interfere less with the activity of the quaternary ammonium compound relative to longer chain length surfactants. The primary function of short chain surfactant is enhancement of the hydrophilic character of the composition and surface wetting. This inhibits de-wetting caused by hydrophobic ADMBA compound that leads to uneven drying and formation of clearly visible streaks. Consequently, the weight ratio of short chain surfactant to ADMBA compound can be important to achieving good shine. Weight ratios from about 1:1 to about 3:1, or from about 1.2:1 to about 2:1 are preferred for delivery of surface shine, though such ratios do depend on the specifics of the composition. For example, higher weight ratios of surfactant to benzalkonium saccharinate veaewrsus surfactant to benzalkonium chloride may be desirable/needed as benzalkonium saccharinate compound is substantially less water soluble than benzalkonium chloride.

ADMBA compounds have large head groups believed to mitigate the formation mixed surfactant micelles relative to selection of an alternative cidal quaternary ammonium compound or a blend of quaternary ammonium compounds that includes benzalkonium quat. During the dry-down process (following application on a hard surface), solutions comprising mixed micelles are believed to dry in large size aggregates leading to enhanced visibility left-behind surface residue. The compositions of the invention therefore preferably consist of ADMBA quat only (i.e., comprises no other quat) for optimum shine end result on hard surfaces.

It has been found that both, ADMBA compound and short chain surfactant (most preferably APG or amine oxide) are needed to simultaneously deliver good surface shine end result and strong cidal efficacy. Longer chain length surfactants, those averaging 12 carbon atoms or more, are found to lead to excessive filming/streaking and can also be detrimental for RSS claims. Poorer RSS results may stem from excessive interaction between the longer chain surfactant and the quaternary ammonium compound that reduces availability of the latter in short contact time cidal activity applications.

Surprisingly, it is also found that ADMBA compounds, relative to other cidal quats, have improved eye toxicity profiles.

Method of Cleaning a Surface

The composition of the invention is particularly suited for cleaning of inanimate surfaces preferably hard surfaces selected from the group consisting of: ceramic, enamel, stainless steel, Inox®, Formica®, vinyl, no-wax vinyl, linoleum, melamine, glass, plastics and plastified wood, and combinations thereof. In particular, the compositions are particularly suited for reducing the microbial population, while leaving surfaces clean, shiny and grease free.

The compositions described herein can be used neat or can be achieved by diluting with water a concentrated composition prior to applying to the surface. In preferred methods, the composition is applied neat, more preferably, the hard surface cleaning composition is sprayed from an aerosol can or from a trigger spray bottle onto the hard surface.

The composition can be applied by any suitable means, including using a mop, sponge, cloth, paper towel, wipe, or other suitable implement.

The surface may be rinsed, preferably with clean water, in an optional further step, and also as a further step, wiped, such as with a cloth or a paper towel. However, rinsing is most often completely unnecessary given the low level of raw materials in the composition and the excellent shine end result and cleaning that is achieved in the absence of a rinse step. Excessive rinsing may also be deleterious with respect to the bactericidal and virucidal 24-hour protection provided by the compositions of the invention. Excessive wiping can also be counterproductive.

In another preferred embodiment of the present invention said method of cleaning an inanimate surface includes the steps of applying, preferably spraying, said composition onto said surface, leaving said composition to act onto said surface for a period of time with or without applying mechanical action, and optionally removing said composition, optionally removing said composition by rinsing said hard surface with water and/or wiping said hard surface with an appropriate implement, e.g., a sponge, a paper or cloth towel and the like. Such compositions are often referred to as "ready-to-use" compositions. In preferred methods, the surface is a hard surface. Preferably the surface is not rinsed after application of the antimicrobial composition.

It is believed that the antimicrobial compositions deliver very good antimicrobial efficacy at low levels of alkyldimethylbenzylammonium compound. The antimicrobial composition of the present invention exhibits improved antimicrobial efficacy, good grease cleaning and/or streak-free shine.

Examples of preferred compositions for use herein include:

An aqueous antimicrobial composition comprising:
i) from about 0.1% to about 0.7% by weight of the composition of an alkyldimethylbenzylammonium compound;
ii) from about 0.05% to about 1% by weight of the composition of a surfactant selected from the group consisting of alkyldimethylamine oxide, alkylpolyglucoside and a mixture thereof wherein the average alkyl chain length of the surfactant is less than 12 carbon atoms and 6 or more carbon atoms;
iii) from 0 to about 0.3% by weight of the composition of a polymer;
iv) at least 90% by weight of the composition water;
wherein the composition is free of dialkyldimethylammonium compound.

An aqueous antimicrobial composition comprising:
i) from about 0.1% to about 0.4% by weight of the composition of an alkyldimethylbenzylammonium compound;
ii) from about 0.1% to about 1% by weight of the composition of a surfactant selected from the group consisting of 2-ethylhexyl alkylpolyglucoside, C8-C10 alkylpolyglucoside, C8-C12 alkyldimethylamine oxide, especially C10 alkyldimethylamine oxide, and a mixture thereof.
iii) from 0 to about 0.3% by weight of the composition of a polymer;
iv) at least 90% by weight of the composition water;
wherein the composition is free of dialkyldimethylammonium compound.

An aqueous antimicrobial composition comprising:
i) from about 0.15% to about 0.4% by weight of the composition of C12-C16 alkyldimethylbenzylammonium chloride;
ii) from about 0.25% to about 0.8% by weight of the composition of a surfactant selected from the group consisting of C8-C10 alkylpolyglucoside, C8-C12 alkyldimethylamine oxide, especially C10 alkyldimethylamine oxide, and a mixture thereof.
iii) from 0 to about 0.1% by weight of the composition of a vinylpyrrolidone polymer selected from the group consisting of a partially butylated polyvinylpyrrolidone polymer, a copolymer of vinylpyrrolidone and dimethylaminopropyl methacrylamide, a copolymer of vinylpyrrolidone and dimethylaminoethylmethacrylate quaternized with diethyl sulfate, and a mixture thereof;
iv) at least 95% by weight of the composition water;
wherein the composition is free of dialkyldimethylammonium compound.

An aqueous antimicrobial composition comprising:
i) from about 0.2% to about 0.45% by weight of the composition of C12-C16 alkyldimethylbenzylammonium saccharinate;
ii) from about 0.3% to about 1.0% by weight of the composition of a surfactant selected from the group consisting of C8-C10 alkylpolyglucoside, C8-C12 alkyldimethylamine oxide, especially C10 alkyldimethylamine oxide, and a mixture thereof.
iii) from 0 to about 0.3% by weight of the composition of a polymer;
iv) from 0 to about 0.5% of an alkanol amine selected from the group consisting of ethanolamine, isopropanolamine, 2-amino-2-methyl-1-propanol, triethanolamine, and a mixture thereof;
v) at least 95% by weight of the composition water;
wherein the composition is free of dialkyldimethylammonium compound.

An aqueous antimicrobial aerosol composition comprising:

(i) from 0.20% to 0.35% by weight of the composition of C12-C16 alkyldimethylbenzylammonium chloride;

(ii) from about 0.10 to about 0.25% by weight of the composition of the composition of a surfactant selected from the group consisting of C8-C10 alkylpolyglucoside, C8-C10 alkyldimethylamine oxide, 3-(polyoxyethylene)propylheptamethyltrisiloxane; and a mixture thereof;

(iii) from 0 to about 0.3% by weight of the composition of a polymer;

(iv) from 0 to about 0.5% of an alkanol amine selected from the group consisting of ethanolamine, isopropanolamine, 2-amino-2-methyl-1-propanol, triethanolamine, and a mixture thereof;

(v) from 0 to about 0.20% of a corrosion inhibitor selected from the group consisting of sodium nitrite, sodium molybdate, sodium nitrite, and a mixture thereof;

(vi) from about 0.3% to about 0.7% by weight of the composition of liquid nitrogen as a propellant.

(vii) at least 95% by weight of the composition water; wherein the composition is free of dialkyldimethylammonium compound.

An aqueous antimicrobial concentrate composition, intended to be diluted 1:10 (1 part concentrate to 9 parts water) at the point of use, comprising:

i) from about 2.5% to about 4% by weight of the composition of C12-C16 alkyldimethylbenzylammonium chloride;

ii) from about 3% to about 8% by weight of the composition of a surfactant selected from the group consisting of C8-C10 alkylpolyglucoside, C8-C12 alkyldimethylamine oxide, especially C10 alkyldimethylamine oxide, and a mixture thereof.

iii) from 0 to about 3% by weight of the composition polymer;

iv) at least 80% by weight of the composition water; wherein the composition is free of dialkyldimethylammonium compound.

EXAMPLES

For the Germicidal Spray Test (GST) results, the following microorganism abbreviations are used:

SA=*Staphylococcus aureus* ATCC 6538

PA=*Pseudomonas aeruginosa* ATCC 15442

TI=*Trichophyton interdigitale* ATCC 9533

For the Residual Self-Sanitizer (RSS) tests, the following microorganism abbreviations are used:

KP=*Klebsiella pneumoniae* ATCC 4352

SA=*Staphylococcus aureus* ATCC 6538

H1N1=Influenza (H1N1) virus ATCC VR-1469, Strain A/PR/8/34

Just prior to testing, the concentrate compositions are diluted in 200 ppm unsoftened water tap (abbreviated 'Tap $H_2O$'). The methodology is described in the Association of Official Analytical Chemists (AOAC). A 1:10 dilution means that a ready-to-test solution is made by combining with 9 milliliters of water for each milliliter of the composition to be diluted. A 1:4 dilution means that a ready-to-test solution is made by combining with 3 milliliters of water for each milliliter of the composition to be diluted. For GST results are reported as the number of carriers showing growth divided by the total number of carriers. For RSS results are reported as log 10 reduction number.

Abbreviations for Chemicals $C_{8-10}$ APG: Octyl-decyl alkylpolyglycoside, tradename Triton® CG-50, supplied by the Dow Chemical Company as a 50% active raw material in water.

$C_{10}$ AO: Decyldimethylamine oxide, tradename Macat® AO-10 supplied by the Pitot Chemical Company as a 30% active raw material in water.

$C_{12}$ AO: Dodecyldimethylamine oxide, tradename Macat® AO-12 supplied by the Pitot Chemical Company as a 30% active raw material in water.

TWEEN: Polyoxyethylene (20) sorbitan monolaurate, tradename Tween 20, supplied by the Croda Corporation as a pure active substance clear yellow viscous liquid.

$C_{14-15}$ $EO_7$: Polyoxyethylene (7) adduct of C14-C15 linear alcohol, tradename Neodol 45-7, supplied by Shell as a pure semi solid.

ADMBAC: n-alkyl (40% C12, 50% C14, 10% C16) dimethylbenzylammonium chloride, tradename Barquat® MB-50, supplied by the Arxada Company as a 50% active raw material in water (~40%) and ethanol (~10%).

ADMEBAC: A blend of quaternary ammonium compounds consisting of 50% n-alkyl (40% C12, 50% C14, 10% C16) dimethylbenzylammonium chloride and 50% n-alkyl (40% C12, 50% C14, 10% C16) dimethyl (ethylbenzyl)ammonium chloride, tradename Barquat® 4280-Z, supplied by the Arxada Company as an 80% active raw material in water and ethanol.

ADMBAS: n-alkyl (40% C12, 50% C14, 10% C16) dimethylbenzylammonium saccharinate, tradename Onyxcide 3300, supplied by Stepan Company as a 95+% active powder.

DDDAC: Didecyldimethylammonium chloride, tradename Bardac® 2250, supplied by the Arxada Company as a 50% raw material in water (~40%) and ethanol (~10%).

DODMAC: Dioctyldimethylammonium chloride, tradename Bardac LF-80, supplied by the Arxada Company as an 80% active raw material in water and ethanol.

BTC: A blend of quaternary ammonium compounds consisting of 40% n-Alkyl (40% C12, 50% C14, 10% C16) dimethylbenzylammonium chloride, 15% dioctyldimethylammonium chloride, 30% octyldecyldimethylammonium chloride and 15% didecyldimethylammonium chloride, tradename BTC® 885, supplied by Stepan Company as a 50% active raw material in water (~40%) and ethanol (~10%).

MEA: Monoethanolamine, supplied by Clariant as a 99+% viscous liquid.

TEA: Triethanolamine, supplied by Sigma-Aldrich as a 99+% viscous liquid.

CITRIC: Citric acid, supplied as a 50% active raw material in water by Tate & Lyle.

GANEX: Partially butylated polyvinylpyrrolidone polymer, tradename Ganex® P-904 LC (Mw~16,000), supplied by Ashland Corporation as a 95+% active powder.

STYLEZE: A copolymer of a copolymer of vinylpyrrolidone and dimethylaminopropyl methacrylamide (with chloride counter-ion, Mw~1,300,000), tradename Styleze CC-10, supplied Ashland as a 10% active raw material in water.

SOREZ: A copolymer of vinyl pyrrolidone and dimetylaminoethylmethacrylate (Mw 1,000,000), tradename Sorez HS-205, supplied by Ashland as a 20% active raw material in water.

GAFQT: A copolymer of vinylpyrrolidone and dimethylaminoethylmethacrylate quaternized with diethyl sulfate (Mw~1,000,000), tradename Gafquat 440 supplied by Ashland as a 30% active raw material in water.

PERFUME: AI187500 Tangerine Twist from Aryless-ence.

All raw materials used in the tests below are provided on a raw material active basis. For example, a composition comprising 0.50% ADMBAC contains 0.50% active alkyldimethylbenzylammonium chloride, which is equivalent to 1.00% of the 50% active Barquat MB-50 raw material.

Compositions #1-4 GST & RSS Testing:

10× concentrate prototypes are made and then diluted 1:10 in 200 ppm unsoftened water prior to running Germicidal Spray (GST) tests and Residual Self Sanitizer (RSS) tests. Microorganism inoculum count was ≥6 log for SA (GST & RSS), PA (GST) and KP (RSS) testing, and ≥5 log for TI (GST) testing.

10× Concentrate Compositions #1-4

| Ingredient | # 1 (wt %) | # 2 (wt %) | # 3 (wt %) | # 4 (wt %) |
|---|---|---|---|---|
| $C_{8-10}$ APG | 5.00 | 3.00 | 3.0 | — |
| $C_{10}$ AO | — | — | — | 3.00 |
| ADMBAC | 3.40 | 2.00 | 2.50 | 2.50 |
| MEA | 1.00 | 1.00 | 1.00 | 1.00 |
| PERFUME | 1.00 | 1.00 | 1.00 | 1.00 |
| DI H2O | Remainder | Remainder | Remainder | Remainder |
| pH | 11.0 | 11.0 | 11.0 | 11.0 |

1×RTU Compositions Following 1:10 Dilution (200 ppm Unsoftened Tan Water)

| Ingredient | # 1 (wt %) | # 2 (wt %) | # 3 (wt %) | # 4 (wt %) |
|---|---|---|---|---|
| $C_{8-10}$ APG | 0.50 | 0.30 | 0.30 | — |
| $C_{10}$ AO | — | — | — | 0.30 |
| ADMBAC | 0.34 | 0.20 | 0.25 | 0.25 |
| MEA | 0.10 | 0.10 | 0.10 | 0.10 |
| PERFUME | 0.10 | 0.10 | 0.10 | 0.10 |
| DI H2O | Remainder | Remainder | Remainder | Remainder |
| pH | 10.4 | 10.4 | 10.4 | 10.4 |

| Diluted Composition # | RSS vs. KP 5 minutes | RSS vs. SA 5 minutes | RSS vs. H1N1 5 minutes |
|---|---|---|---|
| 1 | ≥4.9 log | ≥3.9 log | ≥4.4 log |
| 2 | ≥4.9 log | NT | NT |
| 3 | ≥4.9 log | ≥4.9 log | NT |
| 4 | ≥4.9 log | ≥4.2 log | NT |

NT = Not Tested

| Diluted Composition # | GST vs. PA 1 minute | GST vs. SA 1 minute | GST vs. TI 5 minutes |
|---|---|---|---|
| 1 | 1/60 | 0/60 | 0/30 |
| 2 | 1/60 | 1/60 | 3/30 |
| 3 | 1/60 | 1/60 | 0/30 |
| 4 | 0/60 | 0/60 | 0/30 |

Upon dilution, compositions 1-4 of the invention provide passing Germicidal Spray Test results (0/60 or 1/60) vs. Gram (+) and Gram (−) bacteria at a 1-minute contact time. The only failure is noted with composition #2 (0.20% benzalkonium chloride) which fails the GST vs. *Trichophyton mentagrophytes* at a 5-minute contact time. All of the diluted compositions tested provide residual self-sanitizer (RSS) benefits using US EPA Protocol 01-1A; composition #1 additionally delivers 24-hour residual viral benefits on hard surfaces Shine End Result Testing Method High gloss black ceramic tiles (30.5 cm×30.5 cm) are precleaned, rinsed, wiped dry (Bounty® paper towel) and then treated with 70% isopropanol covering the tile prior to being wiped dry again. Nine (9) evenly spaced glossmeter measurements (Rhopoint glossmeter) are taken, and the average of these is recorded. 1.00-1.05 grams of test solution are then pipetted onto the tile with droplets (~15-25) evenly dispersed throughout the tile. Bounty paper towel (half size perforated, 28.5 cm×14 cm) is folded in half along the length and folded in half a second time. The pre-folded paper towel is then used to wipe the tile up-and-down 6 times, and side-to-side 6 times along paper towel's length edge. Gloss measurements are again recorded and averaged. Results for 20° gloss and maximum spectral reflectance (RSpec) are provided herein. The 20° gloss average is chosen because it provides the most sensitivity on a high energy surface (glossy ceramic); RSpec represents the peak reflectance measured over a very narrow angular band in the specular direction (+/−0.0991); as such it provides an indication of the uniformity of the surface being treated. By subtracting tile gloss post solution treatment from that pre-solution treatment, the gloss loss (Δ20°, ΔRSpec) from the solution treatment is computed. Reduced losses as measured by Δ20° and ΔRSpec measurements are indicative of better filming performance. Glossmeter measurements (Δ20°, ΔRSpec) provide a good indication of the filming caused by the compositional treatment on tile, but do not provide a good indication of streaking or spotting. For this reason, visual grade assessments are also made. Visual grades complement the glossmeter measurements and are assessed on a 5-point scale: Excellent, Very Good, Good, Fair and Poor.

Cleaning End Result Testing

The end result cleaning test is a 2-part test that uses the same tile as the shine end result test. Prior to solution treatment on tile, 0.02 grams of Crisco vegetable oil are rolled (Shur-Line ~7 cm width, ~0.95 cm nap 'Trim & Touch up roller', Mooresville, NC, USA) onto a 10 cm×10 cm square area in the middle of the tile. In the first part of the test, 1.00-1.05 grams of test solution are then pipetted onto the tile with droplets (~15-25) evenly dispersed throughout the tile. Bounty paper towel (half size perforated, 28.5 cm×14 cm) is folded in half along the length and folded in half a second time. The pre-folded paper towel is then used to wipe the tile up-and-down 6 times, and side-to-side 6 times along paper towel's length. The first part of the test acts in large part to spread the soil from the centre of the tile to the full tile. In the second part, another 1.00-1.05 grams of test solution are then pipetted onto the tile with droplets (~15-25) evenly dispersed throughout the tile. A fresh piece of Bounty paper towel (half size perforated, ~28 cm×14.5 cm) is folded in half along the length and folded in half a second time (final dimensions ~14 cm×7 cm). The twice folded paper towel is then used to wipe the tile up-and-down 6 times, and side-to-side 6 times along paper towel's length. The second part of the test provides the estimate of cleaning by the test solution. At the end of the second part, gloss measurements are once again taken and recorded. By subtracting tile gloss post solution treatment from that pre-solution treatment, the gloss loss (Δ20°, ΔRSpec) from the solution cleaning is computed. Glossmeter measurements (Δ20°, ΔRSpec) provide a good indication of the filming caused by the compositional treatment on tile, but do not provide a good measurement of streaking or spotting. For this reason, visual grade assessments are also made. Visual grades complement the glossmeter measurements and are assessed on a 5-point scale: Excellent, Very Good, Good, Fair and Poor. It is noticed that in some cases, compositions with somewhat lower glossmeter results are still visually more appealing that alternate compositions, reflecting a trend the importance of surfactant selection to drive reduced tile streaking.

The samples below are made by diluting either a 10× concentrate (Examples 1, 2, 3, 4, 9, 10, 11, 12, 13, 17, 18, 19, 20), a 4× concentrate (Examples 5, 6, 7, 8, 14, 15, 16) or an RTU with no further dilution (Examples 21-30). Dilution for all Examples 1-21 was performed in tap water (~7 gpg) prior to testing. Dilution for Examples 19 & 20 was additionally conducted in DI water prior to testing.

| Example | 1 | 2 | 3 | 4 | 5 | 6 | 7 | 8 | 9 | 10 |
|---|---|---|---|---|---|---|---|---|---|---|
| $C_{8-10}$ APG | 0.50 | 0.30 | 0.30 | | 0.30 | 0.30 | | | 0.35 | |
| $C_{10}$ AO | | | | 0.30 | | | 0.30 | 0.30 | | 0.30 |
| ADMBAC | 0.34 | 0.20 | 0.25 | 0.25 | 0.13 | 0.20 | 0.13 | 0.20 | 0.25 | 0.25 |
| DDDAC | | | | | 0.13 | 0.05 | 0.13 | 0.05 | | |
| MEA | 0.10 | 0.10 | 0.10 | 0.10 | | | | | | |
| PERFUME | 0.10 | 0.10 | 0.10 | 0.10 | 0.10 | 0.10 | 0.10 | 0.10 | 0.10 | 0.10 |
| Product pH | 10.4 | 10.4 | 10.4 | 10.4 | 7.9 | 7.9 | 7.2 | 7.1 | 7.5 | 7.5 |

| | Shine End Result Test | | | Cleaning End Result Test | | |
|---|---|---|---|---|---|---|
| Example # | Δ20° | ΔRSpec | Visual | Δ20° | ΔRSpec | Visual |
| 1 | −3.9 | −3.4 | V. Good | −7.9 | −5.8 | V. Good |
| 2 | −2.3 | −0.9 | Excellent | −6.0 | −1.4 | Excellent |
| 3 | −1.6 | −2.1 | Excellent | −6.4 | −1.4 | Excellent |
| 4 | −2.7 | −0.4 | Excellent | −4.8 | −2.6 | Excellent |
| 5 | −2.9 | −3.3 | Fair | −14.4 | −8.3 | Poor |
| 6 | −2.1 | −0.3 | Good | −7.0 | −3.2 | Good |
| 7 | −2.1 | −0.3 | Fair | −7.2 | −7.8 | Poor |
| 8 | −2.2 | −0.6 | Good | −8.9 | −5.2 | Good |

-continued

| | Shine End Result Test | | | Cleaning End Result Test | | |
|---|---|---|---|---|---|---|
| Example # | Δ20° | ΔRSpec | Visual | Δ20° | ΔRSpec | Visual |
| 9 | −2.0 | −0.5 | V. Good | −8.9 | −3.3 | V. Good |
| 10 | −2.5 | −1.5 | Excellent | −3.5 | −2.1 | V. Good |

The shine end result and cleaning end result tests illustrate the importance of soil in driving product performance on tiles. Results are stronger (lower loss in 20° gloss and RSpec results, equal to better visual grades) in the absence of soil.

Examples 1-4 illustrate the effect of surfactant and quaternary ammonium compound level, with lower levels of quaternary ammonium compound yielding the better results (compare Example 1 with Examples 2, 3 4). Examples 5-10 illustrate the effects of adding didecyldimethylammonium chloride to formulations comprising benzalkonium chloride. Examples 9, 5 and 6 are similar in C8-10 APG content and have identical quaternary ammonium chloride compound content. Best results are achieved in the complete absence of dialkyldimethyl quaternary compound (Example 9), followed by the case in which the dialkyldimethylammonium compound represents 25% of the overall cidal quaternary ammonium compound total (Example 6); results are weaker when the dialkyldimethylammonium compound represents 50% of the overall cidal quaternary ammonium compound total (Example 5). A similar trend is observed in a C10 dimethylamine oxide matrix. Example 10 with only benzalkonium chloride outperforms Example 8 (with 25% dialkyldimethylammonium compound content) which still showcases better performance than Example 7 (with 50% dialkyldimethylammonium compound content). Examples 5-10 illustrate that the level of dialkyl quaternary compound is advantageously kept as low as possible. Preferably, the composition incorporates no more than 25% dialkyl quaternary compound by weight of the overall cidal quaternary compound content, and most preferably, the composition does not include any dialkyl quaternary compound.

| Example | 11 | 12 | 13 | 14 | 15 | 16 | 17 | 18 | 19 | 20 |
|---|---|---|---|---|---|---|---|---|---|---|
| $C_{8-10}$ APG | | 0.30 | | | | | 0.30 | | 0.30 | |
| $C_{10}$ AO | | | 0.30 | 0.37 | | | | 0.30 | | 0.30 |
| TWEEN | | | | | 0.31 | | | | | |
| $C_{14-15}EO_7$ | 0.30 | | | | | 0.31 | | | | |
| ADMEBAC | | 0.20 | 0.25 | 0.25 | 0.25 | 0.25 | | | | |
| ADMBAC | 0.25 | | | | | | | | 0.25 | 0.25 |
| BTC | | | | | | | 0.25 | 0.25 | | |
| MEA | 0.10 | 0.10 | 0.10 | | | | 0.10 | 0.10 | | |
| TEA | | | | 0.05 | 0.05 | 0.05 | | | | |
| GANEX | | | | 0.10 | 0.10 | 0.10 | | | | |
| STYLEZE | | | | | | | | | 0.03 | 0.03 |
| PERFUME | 0.10 | 0.10 | 0.10 | 0.10 | 0.10 | 0.10 | 0.10 | 0.10 | 0.10 | 0.10 |
| Product pH | 10.3 | 10.3 | 10.3 | 8.2 | 8.1 | 8.0 | 10.3 | 10.3 | 8.8 | 8.8 |

| | Shine End Result Test | | | Cleaning End Result Test | | |
|---|---|---|---|---|---|---|
| Example # | Δ20° | ΔRSpec | Visual | Δ20° | ΔRSpec | Visual |
| 11 | −6.3 | −2.7 | Fair | −9.2 | −10.2 | Poor |
| 12 | −2.6 | −1.7 | V. Good | −6.7 | −5.0 | Good |
| 13 | −2.8 | −0.9 | V. Good | −6.8 | −3.9 | V. Good |
| 14 | −3.4 | −1.0 | V. Good | −4.4 | −4.4 | V. Good |
| 15 | −6.4 | −5.6 | Poor | −8.8 | −8.7 | Poor |
| 16 | −4.6 | −2.3 | Fair | −9.5 | −10.0 | Fair |
| 17 | −2.5 | −1.7 | Fair | −14.3 | −10.2 | Poor |
| 18 | −2.6 | −3.7 | Good | −12.2 | −9.5 | Poor |
| 19 | −0.9 | 0.0 | Excellent | −6.1 | −4.5 | V. Good |
| 20 | −1.5 | −1.5 | Excellent | −5.1 | −4.2 | V. Good |
| 19 (DI H2O) | −0.8 | −0.6 | Excellent | −4.9 | −1.2 | Good |
| 20 (DI H2O) | −1.2 | −0.1 | Excellent | −4.6 | −4.0 | V. Good |

Example 11 illustrates the importance of surfactant selection as changing from C8-10 APG (Example 3) or C10 dimethylamine oxide (Example 4) to a conventional nonionic surfactant (C14-15 EO7, Example 11) results in deterioration of shine end result and cleaning end result glossmeter and visual scores. Examples 12 and 13 illustrate that substituted benzalkonium compound can be used as an alternative to unsubstituted benzalkonium compound. Examples 14, 19 and 20 illustrate the ability to incorporate low levels of film-forming polymer into the compositions of the invention. Example 14 delivers strong shine end result, strong cleaning end result and strong visual grade results. Examples 15 and 16 show much poorer overall performance, suggesting that alcohol ethoxylates are less good relative to the surfactants of the invention. Examples 17 and 18 illustrate the dependence of shine end result and cleaning end result (glossmeter & visual grades) on quaternary ammonium compound type. While Examples 17 and 18 show good shine end result glossmeter scores (i.e., nil-soil conditions), results deteriorate significantly in the presence of soil; visual appearance, in particular, is poor. Poor results occur despite the selection of C10 dimethylamine oxide and C8-10 APG surfactants and can be directly attributed to the BTC 885 quat raw material, of which only 40% is benzalkonium chloride, and 60% is dialkyl (C8-C8, C8-C10 and C10-C10) dimethylammonium chloride. Examples 19 and 20 illustrate the value provided by addition of a very low level (0.03%) of a hard surface shine-enhancing polymer. The overall visual appearance of these compositions is among the best of all samples herein tested. Additionally, small improvements detected in the glossmeter readings are evident when tested in DI water; this is not surprising as hardness ions from the tap water contribute to left-behind residue.

| Example | 21 | 22 | 23 | 24 | 25 | 26 | 27 | 28 | 29 | 30 |
|---|---|---|---|---|---|---|---|---|---|---|
| $C_{10}$ AO | 0.40 | 0.22 | 0.22 | 0.22 | 0.30 | 0.30 | 0.55 | 0.25 | 0.44 | 0.30 |
| $C_{12}$ AO | | 0.22 | 0.22 | 0.22 | | | | | | |
| ADMBAS | 0.30 | 0.22 | 0.22 | 0.22 | | | 0.35 | | 0.22 | 0.22 |
| ADMBAC | | | | | 0.25 | 0.25 | | | | |
| ADMEBAC | | | | | | | | 0.30 | | |
| MEA | 0.10 | | | 0.10 | | | 0.10 | 0.10 | | |
| CITRIC | | 0.02 | | | | | | | 0.10 | |
| SOREZ | | | 0.10 | | 0.10 | | | | | |
| GAFQT | | | | | | 0.10 | | | | 0.10 |
| PERFUME | 0.10 | 0.10 | 0.10 | 0.10 | 0.10 | 0.10 | 0.10 | 0.10 | 0.10 | 0.10 |
| Product pH | 10.4 | 5.8 | 7.6 | 10.4 | 6.6 | 7.0 | 10.5 | 10.4 | 4.8 | 7.2 |

| | Shine End Result Test | | | Cleaning End Result Test | | |
|---|---|---|---|---|---|---|
| Example | Δ20° | ΔRSpec | Visual | Δ20° | ΔRSpec | Visual |
| 21 | −1.4 | −0.1 | Excellent | −3.4 | −2.5 | V. Good |
| 22 | −2.5 | −2.9 | Excellent | −5.3 | −1.3 | Good |
| 23 | −2.6 | −1.9 | Excellent | −6.2 | −2.4 | Good |
| 24 | −1.5 | −1.7 | Excellent | −3.3 | −2.6 | V. Good |
| 25 | −2.8 | −3.6 | V. Good | −3.8 | −4.2 | Good |
| 26 | −2.0 | −2.0 | Excellent | −5.2 | −5.5 | V. Good |
| 27 | −1.7 | −1.6 | Excellent | −3.2 | −1.2 | V. Good |
| 28 | −2.5 | −4.4 | V. Good | −3.8 | −4.5 | Good |
| 29 | −2.1 | −1.8 | V. Good | −4.9 | −3.9 | Good |
| 30 | −0.9 | −2.0 | V. Good | −3.9 | −2.3 | V. Good |

Examples 21-24 and 27, 29 and 30 illustrate the shine end result and cleaning end result achieved by ready-to-use compositions comprising benzalkonium saccharinate. Overall excellent results (glossmeter and visual grades) suggest that the benzalkonium counter-ion (chloride vs. saccharinate) is not meaningfully altering shine end result or cleaning performance. These examples also illustrate that excellent results can be maintained over a wide pH range. Examples and 26 demonstrate that excellent shine and cleaning results can be achieved when a low level of a shine polymer is incorporated into the formulation. Results achieved by incorporating Gafquat 440 in example 30 are particularly good. Example 28 illustrates the performance of a composition comprising C10 dimethylamine oxide and ADMEBAC.

Examples 31-33—Corneal Damage Studies—BCOP

The Bovine Corneal Opacity and Permeability test method (BCOP) is an in-vitro method used to classify substances as ocular corrosives and severe irritants. The method employs isolated corneas from the eyes of dead cattle. Toxic effects to the cornea are measured as opacity and permeability to provide an overall In Vitro Irritancy Score (IVIS): IVIS=15×(Permeability)+Opacity. A formulation with a calculated IVIS of 75 or higher can result in very serious eye damage, resulting in a category I, 'danger' label.

| | Compositions (all with 0.10% Perfume) | IVIS | Permeability | Opacity |
|---|---|---|---|---|
| 31 | 0.50% $C_{8-10}$ APG + 0.28% DODMAC | 59.9 | 3.0 | 14.3 |
| 32 | 1.00% $C_{8-10}$ APG + 0.60% ADMBAC | 51.8 | 1.0 | 37.0 |
| 33 | 0.50% $C_{8-10}$ APG + 0.48% ADMBAC | 47.5 | 0.9 | 33.3 |

Examples 31-33 show that lower calculated IVIS results can be obtained by choosing the quaternary active to be a benzalkonium compound.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aqueous antimicrobial composition comprising:

i) from about 0.1 to about 0.5% by weight of the composition of an alkyldimethylbenzylammonium compound;

ii) from about 0.01% to about 1.5% by weight of the composition of a surfactant selected from the group consisting of alkyldimethylamine oxide, alkyldi(hydroxyethyl)amine oxide, alkylpolyglucoside, alkylbetaine, and a mixture thereof wherein the average alkyl chain length of the surfactant is less than 12 carbon atoms; and iii) at least about 80% by weight of the composition of water;

wherein the composition is substantially free of dialkyldimethylammonium compound, wherein the composition is free of polymer, wherein the composition is free of glycol ether solvent, and wherein the alkyldimethylbenzylammonium compound is selected from the group consisting of C12-C16 alkyldimethylbenzylammonium chloride, C12-C16 alkyldimethyl (ethylbenzyl) ammonium chloride, C12-C16 alkyldimethylbenzylammonium saccharinate, and mixtures thereof.

2. A composition according to claim 1 comprising from about 0.1% to about 0.5% by weight of the composition of the surfactant.

3. A composition according to claim 1 wherein the surfactant is selected from the group consisting of alkyldimethylamine oxide having an average chain length of 9 to 11 carbon atoms, alkylpolyglucoside having an average chain length of 6 to 10 carbon atoms, alkylbetaine having an average chain length of 9 to 11 carbon atoms, and a mixture thereof.

4. A composition according to claim 1 wherein the surfactant is selected from the group consisting of alkyldimethylamine oxide having an average chain length of 9 to 11 carbon atoms, alkylpolyglucoside having an average chain length of 6 to 10 carbon atoms, and a mixture thereof.

5. A composition according to claim 1 wherein the composition is substantially free of surfactants other than surfactant selected from the group consisting of alkyldimethylamine oxide, alkylpolyglucoside, alkylbetaine, and mixtures thereof wherein the average alkyl chain length of the surfactant is less than 12 carbon atoms.

6. A composition according to claim 1 wherein the composition further comprises a pH adjusting agent, selected from the group consisting of citric acid, monoethanolamine, isopropanolamine, triethanolamine and a mixture thereof.

7. A composition according to claim 1 wherein the composition has a pH of 4 or above as measured at 20° C.

8. A composition according to claim 1 further comprising di-valent ion salt.

9. A composition according to claim 1 further comprising fragrance.

10. An article treated with a composition according to claim 1 wherein the article comprises a fibrous structure, the fibrous structure comprises a non-woven material, the article is in the form of a substrate and the substrate has a load factor of from about 3 times to about 10 times of composition per gram of substrate.

11. A method to provide 24-hour self-sanitizing biocidal properties to an inanimate surface wherein residual biocidal activity is measured according to the US EPA protocol #01-1A (vs *Klebsiella pneumonaie*), the method comprising the step of applying a composition according to claim 1 to the surface.

12. A method to provide 24-hour self-sanitizing biocidal properties to an inanimate surface wherein residual biocidal activity is measured according to the US EPA protocol #01-1A (vs *Staphylococcus aureus*), the method comprising the step of applying a composition according to claim 1 to the surface.

13. A method to provide 24-hour self-sanitizing biocidal properties to an inanimate surface wherein residual biocidal activity is measured according to the US EPA protocol #01-1A with modifications (based on EPA interim guidance to show residual efficacy vs H1N1), the method comprising the step of applying a composition according to claim 1 to the surface.

* * * * *